US006799389B2

(12) United States Patent
Wolfgang

(10) Patent No.: US 6,799,389 B2
(45) Date of Patent: Oct. 5, 2004

(54) GAME TAG HOLDER

(76) Inventor: James R. Wolfgang, P.O. Box 36, Sagertown, PA (US) 16433

( * ) Notice: Subject to any disclaimer, the term of this patent is extended or adjusted under 35 U.S.C. 154(b) by 15 days.

(21) Appl. No.: 10/187,077

(22) Filed: Jun. 28, 2002

(65) Prior Publication Data

US 2004/0000082 A1 Jan. 1, 2004

(51) Int. Cl.[7] .................................................. G09F 3/00

(52) U.S. Cl. .............................. 40/300; 40/304; 40/661; 40/649; 40/653; 40/664; 40/665; 40/668

(58) Field of Search .......................... 40/300, 301, 302, 40/303, 304, 661, 645, 649, 653, 664, 665, 668; 283/80

(56) References Cited

U.S. PATENT DOCUMENTS

| | | | | |
|---|---|---|---|---|
| 3,468,050 A | * | 9/1969 | Pool | 40/302 |
| 3,785,337 A | * | 1/1974 | Flowerday | 40/665 |
| 3,908,418 A | * | 9/1975 | Stoffel | 70/456 R |
| 4,149,329 A | * | 4/1979 | Graves | 40/668 |
| 4,266,354 A | * | 5/1981 | Daenen | 40/665 |
| 4,377,047 A | * | 3/1983 | Adams et al. | 40/665 |
| 4,680,882 A | * | 7/1987 | Watson, Jr. | 40/665 |
| 2002/0095844 A1 | * | 7/2002 | Slavik | 40/645 |

* cited by examiner

Primary Examiner—Gary C. Hoge
(74) Attorney, Agent, or Firm—Richard K. Thomson

(57) ABSTRACT

A game tag holder has a front panel and a rear panel connected by a living hinge. The two panels are preferably made of a transparent plastic (e.g., polypropylene) and have integral attachment hardware: protrusions and reinforced receptacles for closing the two panels and a barbed strip and aligned openings for securing the tag holder to the downed game.

7 Claims, 2 Drawing Sheets

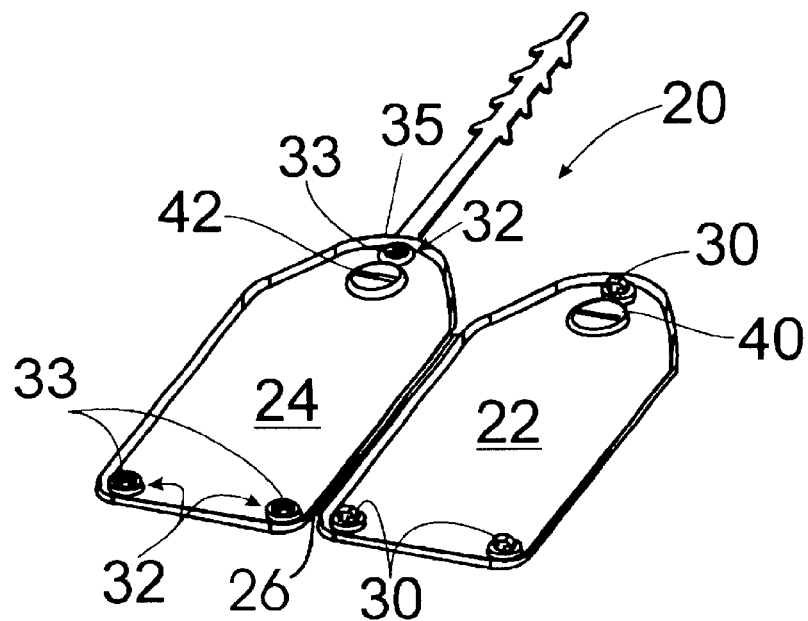
Fig. 2
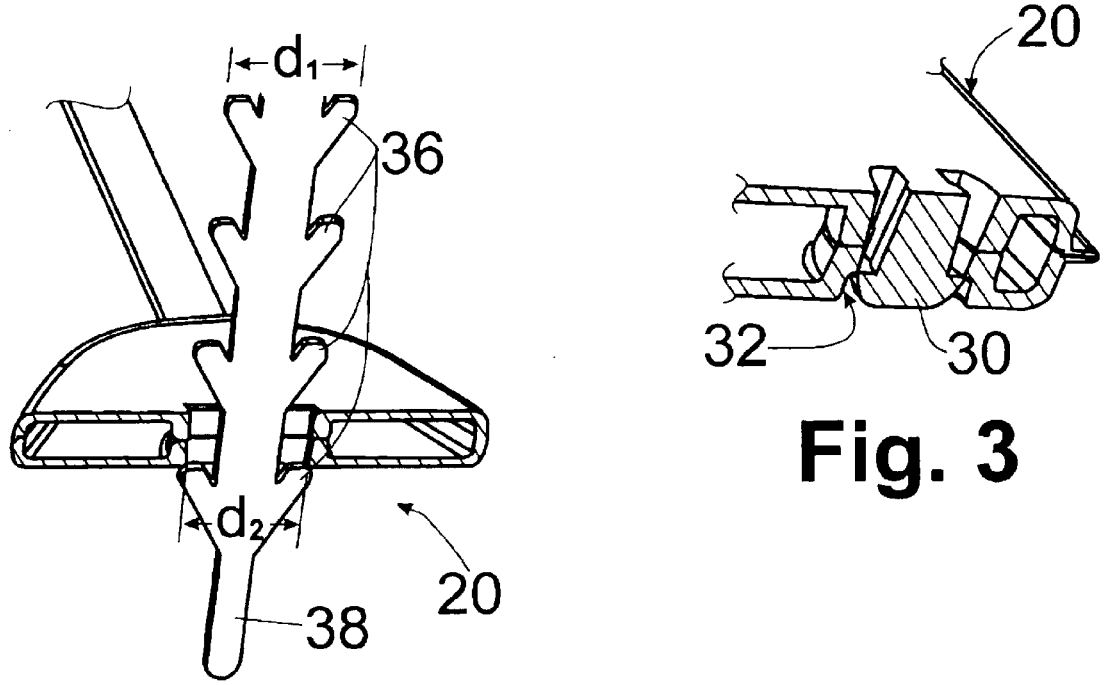
Fig. 3
Fig. 4

GAME TAG HOLDER

BACKGROUND AND SUMMARY OF THE INVENTION

The present invention is directed to a game tag holder that is transparent and which may be quickly and easily attached to the quarry. The tag may be viewed through the "window" of the holder to verify the particulars on the tag.

Hunters who harvest game animals (deer, elk moose, turkey, etc.) are required to tag the carcass before it is transported. The hunter is required to fill out information on the harvest, or game, tag and then attach it securely to the leg, ear, or antler of the game immediately after the kill. Usually, the tag is attached to the game by means of a twist tie, string, sticker or some other means that leaves the tag unprotected. The tag can be easily lost or destroyed by weather such as rain or snow, as well as, the rigors of transporting the game from the field.

The present invention is directed to a game tag holder that has at least one (and preferably both) sides made of a transparent plastic material, such as polypropylene. The front panel is attached to the back panel by a living hinge and first and second connection means hold the front panel in an overlying relationship to the rear panel so as to form a compartment for receiving the tag. Attachment means enable the tag holder to be quickly and easily secured to the game. The attachment means is similar in form to a bag tie and is integrally formed with one edge of the holder. It is contemplated that different sized holders will be provided, different sizes for different sized tags. In the alternative, a single tag holder can be made to accommodate all sized tags.

Various other features, advantages and characteristics of the present invention will become apparent after a reading of the following specification.

BRIEF DESCRIPTION OF THE DRAWINGS

The preferred embodiment(s) of the present invention are set forth in the drawings, like items bearing like reference numerals and in which

FIG. 2 is perspective view of the first embodiment with the holder shown open;

FIG. 3 is a cross-sectional end view as seen along line 3—3 in FIG. 1; and

FIG. 4 is a cross-sectional end view as seen along line 4—4 in FIG. 1.

DETAILED DESCRIPTION OF THE PREFERRED EMBODIMENT(S)

Figure 1:
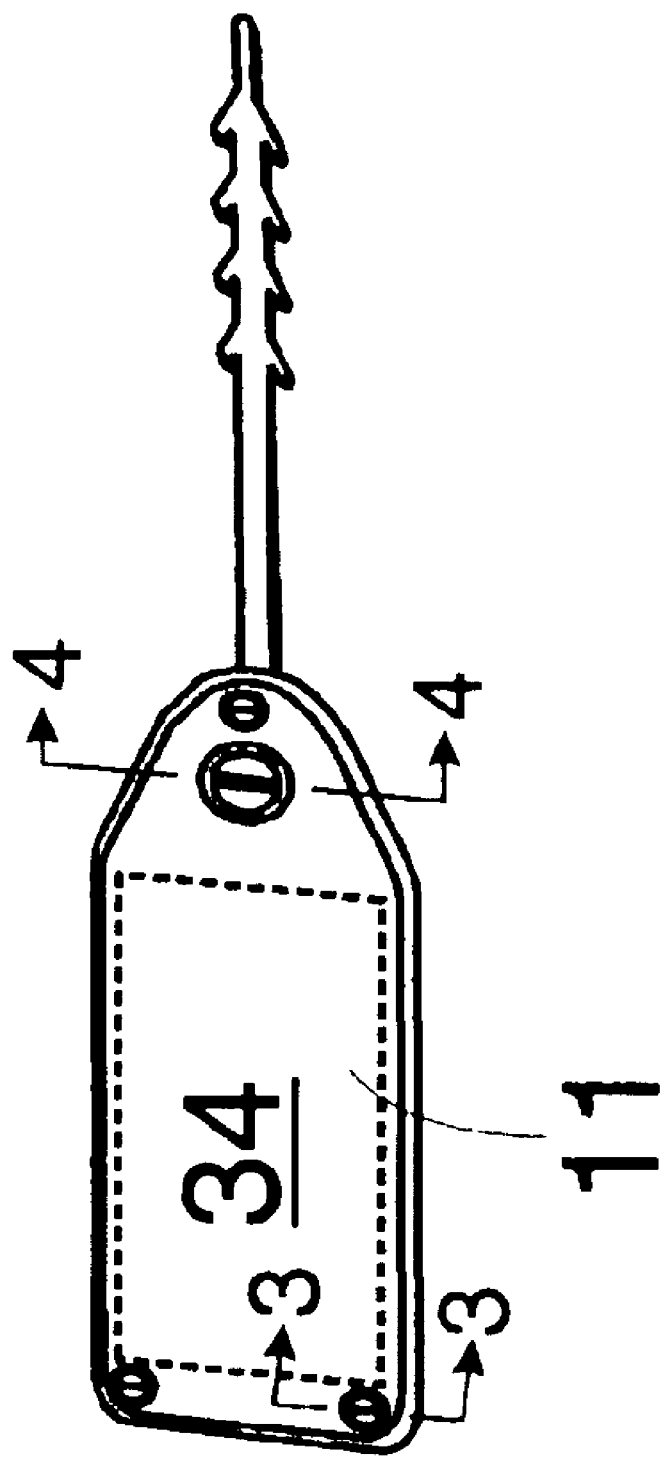
FIG. 1 is a top view of a first embodiment of the game tag holder of the present invention.

A first embodiment of the game tag holder of the present invention is shown in FIGS. 1–4 generally at 20. As best seen in FIG. 2, game tag holder 20 comprises a front panel 22, a rear panel 24 and hinge means 26 interconnecting the front panel 22 to rear panel 24. Hinge means 26 is preferably a living hinge permitting front panel 22 to be folded into a position in which it overlies rear panel 24. The front panel 22, as a minimum, is transparent enabling the viewing of the game tag 11 contained therein. Preferably, front and rear panels 22 and 24 are molded of the same transparent plastic, in the preferred embodiment, polypropylene.

First connection means, a plurality of protrusions 30 extend from the inner face of front panel 22 and are designed to be received in a like plurality of second connection means formed as receptacles 32 in rear panel 24. Receptacles 32 have a lip portion 33 extending outwardly toward front panel 22 which serves to reinforce the opening. It will be appreciated that the positions of protrusions 30 and receptacles 32 could be reversed without being outside the scope of the present invention. When protrusions 30 engage in receptacles 32, the two connection means interlock and front panel 22 is retained in a position overlying rear panel 24 creating a tag-receiving compartment 34 which is closed on three sides. Three sets of protrusions 30 and receptacles 32 are shown, this number being a preferred minimum number to provide a stable compartment 34.

Attachment means in the form of a plurality of flexible barbs 36 are formed on strip 38 which is integrally formed with one edge 35 of tag-receiving compartment 34. Strip 38 is similar in form and function to one form of a trash bag tie currently in use. Flexible barbs 36 extend outwardly a first maximum dimension $d_1$. A first reinforced opening 40 is formed in front panel 22 and a second aligned reinforced opening 42 is formed in rear panel 24. Aligned openings 40 and 42 receive strip 38 and have a second maximum dimension $d_2$ which is less than $d_1$ so as to capture and retain barbs 36. Strip 38 may be wrapped around an appendage of the game or inserted through a slit in an ear or wing, and inserted through aligned openings 40, 42 where barbs 36 will retain tag holder 20 on the game carcass.

Various changes, alternatives and modifications will become apparent after a reading of the foregoing specification. It is intended that all such changes, alternatives and modifications as fall within the scope of the appended claims be considered part of the present invention.

I claim:

1. A game tag holder comprising
   a) a front panel made of transparent plastic having first generally uniform thickness;
   b) a rear panel having a same generally uniform thickness;
   c) a hinge means extending along a common edge of said front and rear panels enabling said front panel to fold over said rear panel into an overlying position;
   d) first connection means on said front panel;
   e) second connection means on said rear panel engagable with said first connection means to retain said front panel in said overlying position forming a tag receiving compartment which is closed on three sides protecting a tag from the elements and enabling the tag to be inserted into the open fourth side;
   f) attachment means extending from an edge portion of said tag receiving compartment enabling said tag receiving compartment to be quickly and easily secured to a game carcass, wherein said attachment means comprises an elongated strip with a plurality of sets of flexible barbs extending laterally outwardly therefrom, said flexible barbs extending outwardly a first maximum width, said plurality of sets enabling said attachment means to accommodate a plurality of different sized objects and a pair of aligned openings in said front and rear panels for receiving a portion of said elongated strip, said aligned openings having a second maximum width which is less than said first maximum width of said flexible barbs and an inwardly extending reinforcing lip portion to reinforce said opening.

2. The game tag holder of claim 1 wherein said back panel is made of the same transparent plastic as said front panel.

3. The game tag holder of claim 2 wherein said transparent plastic comprises polypropylene.

4. The game tag of claim 1 wherein said hinge means comprises a living hinge extending along a longitudinal edge portion of said front and rear panels.

5. The game tag of claim 1 wherein a first one of said first and second connection means comprises a first plurality of cylindrical protrusions each having a radially extending flange, said cylindrical protrusions extending from one of said front and rear panels.

6. The game tag of claim 5 wherein a second one of said first and second connection means comprises a second plurality of cylindrical receptacles for receiving and interlocking with said first plurality of cylindrical protrusions, said receptacle having a recessed shoulder for engaging said radially extending flange at a point where said protrusion does not extend past a surface of said rear panel.

7. The game tag of claim 6 wherein said plurality of connection means comprises at least three sets of cylindrical protrusions and cylindrical receptacles.

* * * * *